Nov. 22, 1949　　　L. B. HARRINGTON　　　2,488,723
ELECTROMAGNETIC MOTOR
Filed Nov. 10, 1947　　　　　　　　　　　　　2 Sheets-Sheet 1
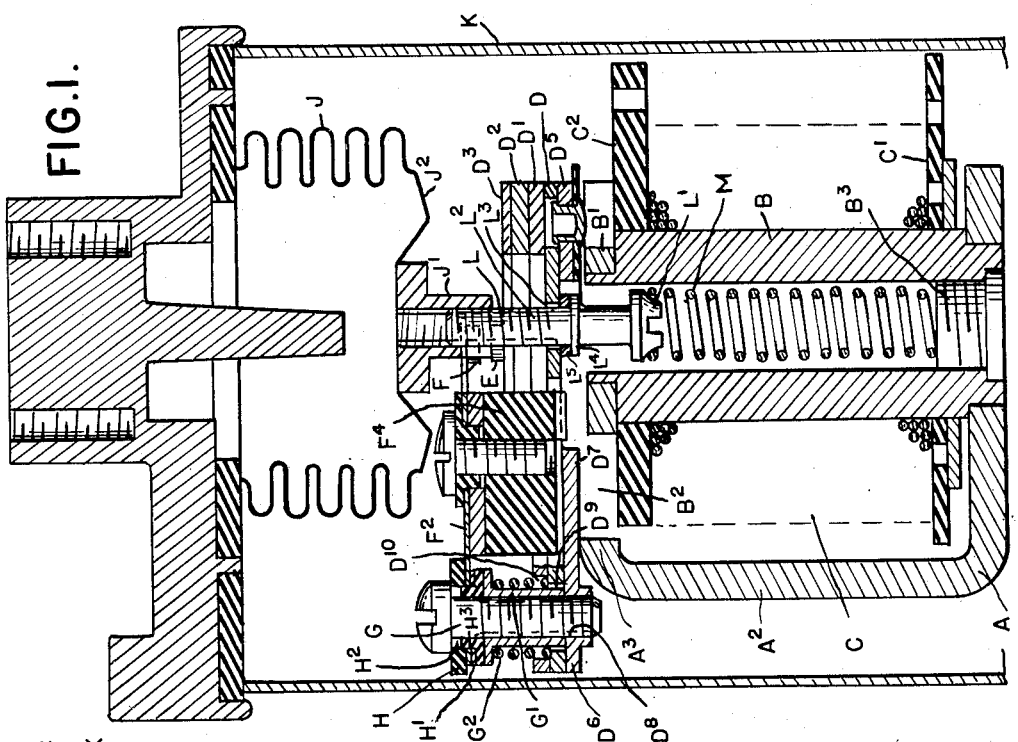
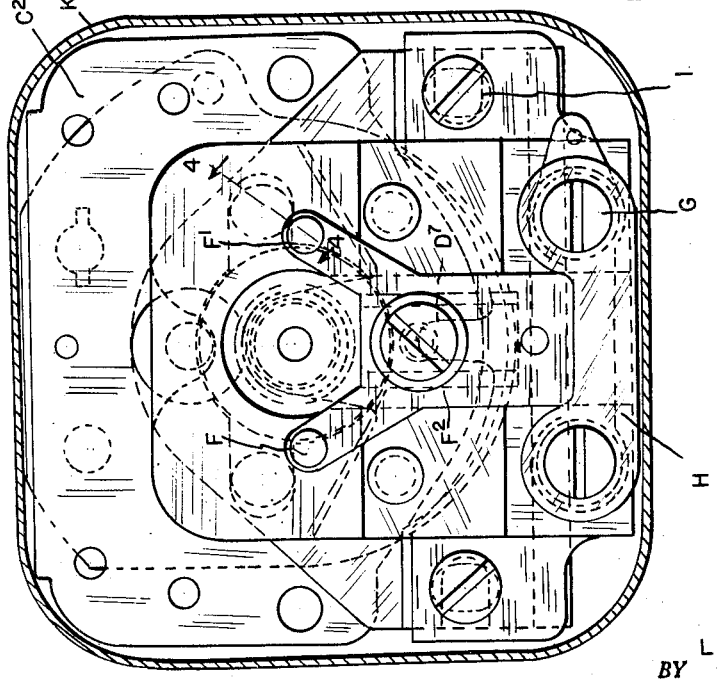
INVENTOR.
LESTER B. HARRINGTON
BY
Whittemore Hulbert & Belknap
ATTORNEYS Nov. 22, 1949 L. B. HARRINGTON 2,488,723
ELECTROMAGNETIC MOTOR
Filed Nov. 10, 1947 2 Sheets-Sheet 2

*INVENTOR.*
LESTER B. HARRINGTON
BY
Whittemore Hulbert + Belknap
ATTORNEYS

Patented Nov. 22, 1949

2,488,723

UNITED STATES PATENT OFFICE 2,488,723

ELECTROMAGNETIC MOTOR

Lester B. Harrington, Ludington, Mich., assignor to Autopulse Corporation, Ludington, Mich., a corporation of Michigan Application November 10, 1947, Serial No. 785,056

7 Claims. (Cl. 172—126)

The invention forms a continuation in part of an earlier application, Serial No. 560,995, filed October 30, 1944, which is now Patent 2,442,203, issued May 25, 1948.

It is the object of the invention to obtain a construction which combines with certain advantageous features of the earlier apparatus certain improvements which simplify construction and improve the operation thereof.

More specifically, it is an object of the invention to obtain an operating unit assembly which can be easily attached to, or removed from, the static portions of the motor.

It is a further object to obtain a unit which requires no adjustment either prior or subsequent to its original installation.

It is a further object to obtain a construction which has a greater length of life.

Still further, it is an object to obtain a construction which is an assembly of simple and easily manufactured elements which when once assembled are held in permanent operative relation to each other. With these and other objects in view the invention consists in the construction as hereinafter set forth.

In the drawings:

Fig. 1 is a vertical central section through my improved motor as applied to operation of a liquid pump;

Fig. 2 is a sectional plan view thereof;

In common with the prior motor construction above referred to, my improved motor comprises an electromagnet having the unlike poles thereof in reasonable proximity but separated by an intervening air gap. There is also a main armature mounted to overlap the unlike poles of this magnet and to bridge the air gap therebetween. Also, an auxiliary armature which likewise magnetically bridges the air gap. These two armatures cooperate with each other in carrying the load but only the main armature is directly connected thereto. The auxiliary armature functions primarily to close or open the circuit through which the magnet is energized. However, whenever the circuit is closed the pull of the auxiliary armature is added to that of the main armature for carrying the load and actuating an energy-storing means.

In my former construction, as above generally described, the main armature was hinged to the static unit through a flexible and resilient flat spring member. The repeated flexing of this member during operation of the motor produced a detrimental effect shortening the life of the structure. With my improved construction, the armature is rockably mounted on the static member and the resilient element is a coil spring having a much greater length of life. Furthermore, the plate on which the armature rocks forms a part of the operating unit assembly and may be rigidly attached to the static unit by bolts. In other words, the operating unit assembly is complete in itself and requires no adjustment when mounted on the static unit. A further improvement is the addition of a small projection on the armature support plate to act as a means to break the electric circuit when desired. This enables the entire armature assembly to be built complete, with the circuit-controlling mechanism integral.

Static unit

A is a member formed of magnetic metal having a base portion A', a vertical portion $A^2$ and a horizontally extending flange $A^3$ constituting one of the magnetic poles. Secured to the base portion A' is a hollow post portion B also formed of magnetic metal and having secured to its upper end a pole piece B', two pole portions $A^3$ and B' having an air gap $B^2$ therebetween which is generally concentric with the axis of the post B. Surrounding the post B is a coil C of insulated wire which when energized will produce a strong electric field between the pole portions. Insulator plates C' and $C^2$ are arranged respectively below and above the coil C to hold the latter in position.

Operating unit assembly

Figure 6:
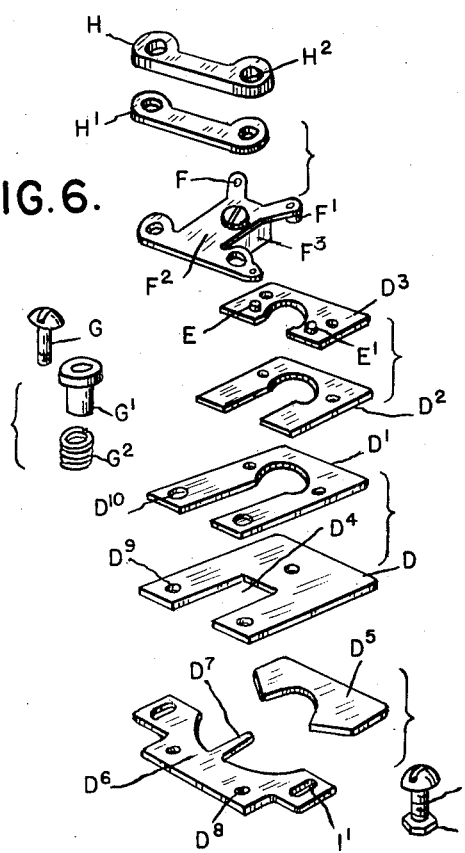
Fig. 6 is a perspective view of the elements forming the operating assembly detached from each other.
Figure 5:
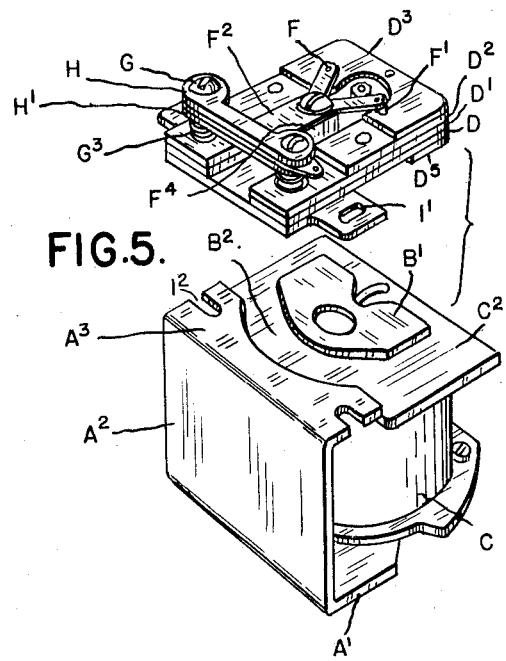
Fig. 5 is a perspective view showing the operating and static assemblies detached.
Figure 6A:
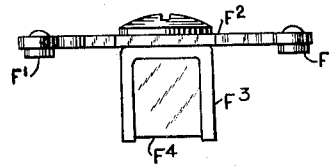
Fig. 6a is an end elevation of the member $F^2$, Fig. 6.
Figure 3:
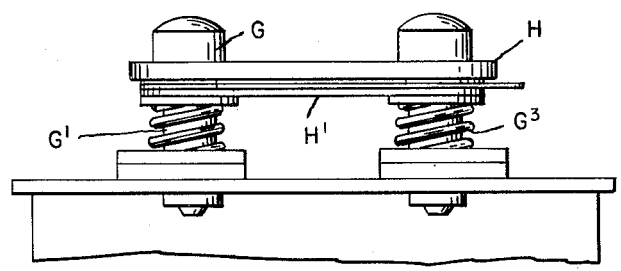
Fig. 3 is an end elevation viewed from the hinged side of the armature unit.
Figure 4:
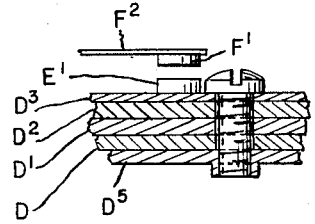
Fig. 4 is a section on line 4—4, Fig. 2.

As above described the operating unit includes a main armature, an auxiliary armature in cooperative relation to each other and a circuit closing and opening switch operated by the auxiliary armature. Preferably these elements are formed chiefly of sheet metal stampings which are shown in detail in Fig. 6. The main armature proper includes the U-shaped sheet metal stampings D, D', $D^2$ and $D^3$ formed of magnetic metal and secured to each other preferably by spot welding to form a laminated structure. The cut out portion of the lower stamping D is less in length than that of the next adjacent stamping $D'$ so that a portion $D^4$ in the former overlaps the cut out in the latter. The members D and $D'$ are, however, the same in total length, but the members $D^2$ and $D^3$ are progressively shorter and have their edges opposite the cut out arranged in alignment. The member $D^3$ is provided with a pair of electrical contacts E and $E'$ projecting above the upper face thereof. These contacts are in registration with a pair of contacts F and $F'$ secured to a resilient flexible sheet metal stamping $F^2$. The stamping $F^2$ may be formed of non-magnetic metal, such as bronze, and is associated with the other members as will be later described. A sheet metal stamping $D^5$ is secured to the underside of the member D adjacent to the edge thereof, which is opposite the cut out portion. There is, further, a stamping $D^6$ which is arranged beneath the member D in alignment with the cut out edge thereof. This member $D^6$ is of a contour on its inner side which corresponds to that of the flange $A^3$ but is provided with an inwardly projecting tongue $D^7$ at the center thereof. Each of the members D, $D'$, $D^6$ and $F^2$ is provided with a pair of apertures therein which are in alignment with each other in the several members. Each of the apertures $D^8$ in the member $D^6$ are threaded to engage a screw and these screws pass through the aligned apertures in the members D, $D'$ and $F^2$. Collars $G'$ are sleeved on the screws G and coil springs $G^2$ are sleeved on said collars one end of the spring abutting against a flange $G^3$ on the collar and the opposite end abutting against the portion of the member D surrounding aperture $D^9$ therein. The member $D'$ has a pair of apertures $D^{10}$ which are larger in diameter than the aperture $D^9$ so as to provide clearance for the spring $G^2$. Members H and $H'$ formed of plastic, or other insulating material, are ranged respectively above and below the member $F^2$ being provided with apertures $H^2$ which are in registration with the apertures $D^9$ and $D^{10}$.

In assembling the members above described, the members $D^5$, D, $D'$, $D^2$ and $D^3$ are rigidly secured to each other as by screws. The springs $G^2$ are placed on the collars $G'$ and both are engaged with the apertures $D^9$ and $D^{10}$ and the members D and $D'$. The member $F^2$ is placed above collars $G'$ and the members H and $H'$ above and below the member $F^2$ after which the screws G are inserted through the aligned apertures in the several members and through the collars $G'$ to engage the threaded apertures $D^8$ in the member $D^6$. When the screws are tightened the member $F^2$ will be clamped between the members H and $H'$ and the collars $G'$, said member $F^2$ being insulated from screws G by insulating member $H^3$, while the collars $G'$ will be clamped against the member $D^6$, the springs $G^2$ being compressed during such assembly. This will secure together all of the members of the operating unit. The unit as a whole may be then attached to the static unit by means of bolts I, which pass through aligned apertures $I'$ and $I^2$ to engage nuts $I^3$. The member $F^2$ has secured to its underside a member $F^3$ formed of magnetic metal and of an inverted U cross-section. This member constitutes the auxiliary armature which magnetically bridges the airgap $B^2$ between the pole portions $A^3$ and $B'$. There is also a non-magnetic member $F^4$ filling the channel within the U and extending the length thereof. In normal position of the parts the member $F^2$ will hold its contacts F and $F'$ slightly spaced from the cooperating contacts E and $E'$ on the member $D^3$. The member $D^6$ is held by the screws I and nuts $I^3$ rigidly clamped to the flange $A^3$ of the static unit but the other members of the assembly are movable in relation thereto as will be later explained.

Liquid fuel pump

While my improved motor may be used for various purposes, I will specifically describe its application to a liquid fuel pump. The pump comprises a metallic bellows member J which is secured within a housing K to be above the operating unit assembly. The lower end of this bellows is closed and is connected to the main armature by a rod or pin member L having a head $L'$ at its lower end and a shank portion $L^2$ passing through an aperture $L^3$ in a portion of the member D which overlaps the cutouts in the members $D'$, $D^2$ and $D^3$. The shank $L^2$ is provided with a collar $L^4$ and washer $L^5$ which form an operating connection between the main armature and the rod L, said shank $L^2$ also being threaded to engage a threaded member $J'$ on the closed bottom $J^2$ of the bellows J thereby attaching said bellows to the armature. A coil spring M is placed within the hollow post B with its upper end engaging a seat on the head $L'$, and its lower end abutting against a cap $B^3$ at the lower end of the hollow post B. This spring forms a means for storing the energy developed by the downward movement of the armature when actuated by the magnet.

Operation

The reciprocating movement of the motor is caused by the alternate closing and opening of an electric circuit including the coil C. In normal position the spring M will raise the main armature so as to press the electrical contacts E and $E'$ on the member $D^3$ against the contacts F and $F'$, the latter being also flexed in an upward direction. One terminal of the coil C is connected with the member $F^2$ which is insulated from the other metallic members by the plastic members $H'$ and $H^2$. Therefore, when the contacts E, $E'$, F, $F'$, are closed the electric circuit through the coil will be established to energize the magnet. As both the main armature formed by the members D, $D'$, etc., and the auxiliary armature formed by the member $F^3$ bridge the air gap $B^2$ magnetically both will be simultaneously actuated in a downward direction. However, the main armature is under the resistance of the spring M whereas the auxiliary armature is free. Consequently, the latter armature will tend to a greater acceleration than the main armature causing a pressure of the contacts F, $F'$ against the contacts E and $E'$ which insures a good electrical connection. Also, whatever force is exerted on the auxiliary armature will be added to the force of the main armature to compress the spring M. Downward movement of the auxiliary armature $F^3$ is arrested when the insulator filler member $F^4$ comes in contact with the tongue $D^7$ on the member $D^6$. The main armature, however, continues its downward movement with the result that the contacts E and $E'$ will be separated from the contacts F and $F'$ to open the electric circuit and deenergize the magnet. Both armatures will then be free to move upward, but the resiliency of the member $F^2$ will cause a greater acceleration of the relatively small mass of the auxiliary armature $F^3$ than that of the greater mass of the main armature. The main armature also is retarded by its necessary work of compressing the bellows J. The electric circuit will, therefore, remain open until the main armature has been raised to a predetermined point whereupon contacts E, E', F, F' will again be closed and the magnet re-energized to repeat the cycle.

It will be understood that when the main armature is raised by the spring M. the outer end of said armature will merely rock on the plate D⁶ which movement is opposed only by the coil springs G². The screws G and collars G' will hold the armature against lateral displacement but will not interfere with its free rocking movement. Such construction will have a much longer life than one in which the armature is itself flexed. Another advantageous feature of the construction is that the arresting of movement of the auxiliary armature is through contact of the non-magnetic member F⁴ with the tongue D⁷. Where the stopping is effected through the contacting of one metallic member against another, even if one of these members is non-magnetic or di-magnetic, there is, nevertheless, a tendency for them to adhere to each other. This is avoided by forming one of the contacting members of non-metallic material. Another advantageous feature of the construction is that an increase in the amplitude of oscillatory movement of the armature (as where there is a dropping of the load) will not be injurious thereto. This is for the reason that the material of the armature is not itself flexed and the coil springs G² will not be injured by this over-movement. It sometimes happens in the operation of a liquid fuel pump that the pumping chamber is initially filled with air so that its resistance to movement by the motor is lessened. To avoid abnormal flexing of the metallic bellows under such conditions, it has been the practice in the past to use a stop for limiting the bellows movement but this is objectionable as it sets up detrimental vibrations. With my improved construction such stop is not necessary and the coil springs G² may alone be relied upon for limiting the amplitude of movement.

The spacing of the contacts E, E', F, F' is determined by the longitudinal dimension of the collar member G' against which the resilient and flexible member F² is clamped. It is, therefore, unnecessary to make any adjustments either initially or during the continued life of the structure as the proper relation of parts is established by the assembly of the elements. Furthermore, as above described, the operating unit which includes the member D⁶ may be assembled with the static unit by merely clamping the same together with the screws I and nuts I³.

What I claim as my invention is:

1. In a motor, the combination with an electromagnet including a rigid frame having unlike pole portions in proximity but with an air gap therebetween, of an operating assembly attachable as a unit to said frame comprising an attachment plate, a main armature rockably supported on said attachment plate, resilient means yieldably opposing rocking of said armature, an auxiliary armature, resilient means for mounting said auxiliary armature on said attachment member, both of said armatures being positioned to magnetically bridge said air gap when said unit is mounted on said frame, and cooperating contacts of a circuit closing switch for energizing said magnet, said contacts being respectively carried by said main and auxiliary armatures and normally spaced when said operating assembly is detached from said rigid frame, and resilient means operatively associated with said rigid frame and operating unit to move said main armature counter to the direction of magnetic pull and thereby close said cooperating contacts and to also store the kinetic energy of both armatures when said circuit is closed.

2. In a motor, the combination with an electromagnet including a rigid frame having unlike pole portions in proximity but with an air gap therebetween, of an operating assembly attachable as a unit to said frame comprising an attachment member, a main armature rockably supported on said attachment member and having an aperture therein, a post on said attachment member passing through said aperture, a spring sleeved on said post to bear against said armature, an abutment for the opposite end of said spring on said post, an auxiliary armature, a resilient member carrying said auxiliary armature, an insulating mounting for said resilient member on the upper portion of said post both of said armatures being positioned to bridge said air gap when said unit is mounted on said frame, cooperating contacts of an energizing circuit closing switch for said magnet said contacts being respectively carried by said main and auxiliary armatures and normally spaced from each other when the operating assembly is detached from said rigid frame, but normally contacting each other when said operating assembly is operably mounted on said rigid frame, and resilient means operatively associated with said rigid frame and unit for actuating said main armature counter to the direction of pull of the magnetic force and for also storing the kinetic energy of both armatures when said circuit is closed.

3. In a motor, the combination with an electromagnet including a rigid frame having unlike pole portions in proximity but with an air gap therebetween, of an operating unit comprising a U-shaped main armature, an auxiliary armature located between the legs of the U, a plate extending transversely beneath the legs of the U, posts extending upward from said plate through apertures in said legs, coil springs sleeved on said posts, a resilient member attached to said auxiliary armature, an insulator mounting for said resilient member on the upper ends of said posts, contacts on said main armature and resilient member cooperate to form a circuit closing switch for the energizing circuit of said magnet, means for clamping said plate to one of the poles of said magnet to form an extension of said pole, a bearing on which said main armature may rock with both of said armatures magnetically bridging said air gap, and a resilient energy storing member connected to said main armature and adapted to move the same counter to the magnetic pull.

4. In a motor, the combination with an electromagnet including a rigid frame having unlike pole portions in proximity but with an air gap therebetween, of an operating unit comprising a U-shaped main armature, an auxiliary armature located between the legs of the U and being itself of inverted U cross-section with a filler of insulating material, a plate extending transversely beneath the legs of the U, posts extending upward from said plate through apertures in said legs, coil springs sleeved on said posts, a resilient member attached to said auxiliary armature, an insulator mounting for said resilient member on the upper ends of said posts, contacts on said main armature and resilient member cooperating to form a circuit closing switch for the energizing circuit of said magnet, means for clamping said plate to one of the poles of said magnet to form an extension of said pole, a bearing on which said main armature may rock with both of said armatures magnetically bridging said air gap, resilient means engaging said armature adapted to move the same counter to the electromagnetic pull, and a tongue projecting from said plate forming a stop for engaging said filler of insulating material to arrest movement of said auxiliary armature during continued movement of said main armature thereby separating said cooperating contacts and opening the energizing circuit of the magnet.

5. In a motor, the combination with an electromagnet including a rigid frame having unlike pole portions in proximity but with an air gap therebetween, of an operating unit comprising a main armature formed of a plurality of U-shaped stampings secured to each other, an auxiliary armature of inverted U-shaped cross-section and with a filler of insulating material, said auxiliary armature being located in the space between the legs of said U-shaped stampings, a plate extending transversely beneath the legs of the lower U-shaped stamping, posts projecting upward from said plate through apertures in the legs of said stampings, coil springs sleeved on said posts, a resilient flexible member secured to said auxiliary armature, an insulator mounting for said resilient member on the upper ends of said posts, contacts on said main armature and resilient member cooperating to form a circuit closing switch for the energizing circuit of said magnet, means for clamping said plate to one of the poles of said magnet to form an extension of said pole and a bearing on which said main armature may rock with both armatures magnetically bridging said air gap, resilient means engaging said main armature and adapted to actuate the same counter to the electromagnetic pull, and a tongue on said plate forming a stop for contacting with said filler of insulating material to arrest movement of said auxiliary armature during continued movement of said main armature thereby opening said switch and deenergizing said magnet.

6. In an electromagnetic motor having a rigid frame forming an electromagnet with unlike poles spaced to form an air gap therebetween, and having resilient means operably connected therewith for storing energy and moving a variable load connected thereto; an operating unit comprising an attachment member for securing said operating unit to said rigid frame, main and auxiliary armatures rockably mounted on said attachment member and positioned to bridge said air gap when secured to said frame, cooperating contacts for controlling the energizing of said electromagnet, said contacts being carried respectively by said main and auxiliary armatures and normally spaced to a predetermined degree when said operating unit is detached from said rigid frame, and cooperating means carried respectively by said attachment member and auxiliary armature for separating said contacts and deenergizing said electromagnet.

7. In an electromagnetic motor having a rigid frame forming an electromagnet with unlike poles spaced to form an air gap therebetween, and having resilient means operably connected therewith for storing energy and moving a variable load connected thereto; an operating unit comprising an attachment member for securing said operating unit to said rigid frame, a main armature rockably supported on said attachment member and having an aperture therein, a post secured to said attachment member and passing through said aperture, a collar sleeved on said post, a spring sleeved on said collar and having its opposite ends bearing respectively against said armature and collar, an auxiliary armature, a resilient member carrying said auxiliary armature, an insulating mounting for said resilient member on the upper portion of said post, both of said armatures being positioned to bridge said air gap when said operating unit is attached to said rigid frame, cooperating contacts carried respectively by said main and auxiliary armatures and spaced from each other when said operating unit is detached from said rigid frame, a non-magnetic member secured to said resilient member, and a tongue portion projecting from said attachment member, said tongue portion and non-magnetic member cooperating to separate said cooperating contacts and de-energize said electromagnet.

LESTER B. HARRINGTON.

REFERENCES CITED

The following references are of record in the file of this patent:

UNITED STATES PATENTS

| Number | Name | Date |
|---|---|---|
| 836,659 | Wilcox | Nov. 20, 1906 |
| 1,855,859 | Lesh | Apr. 26, 1932 |
| 2,442,203 | Harrington | May 25, 1948 |